Nov. 26, 1935.    B. H. ANIBAL    2,022,102
ENGINE FRONT MOUNTING
Filed Oct. 29, 1934    2 Sheets-Sheet 2
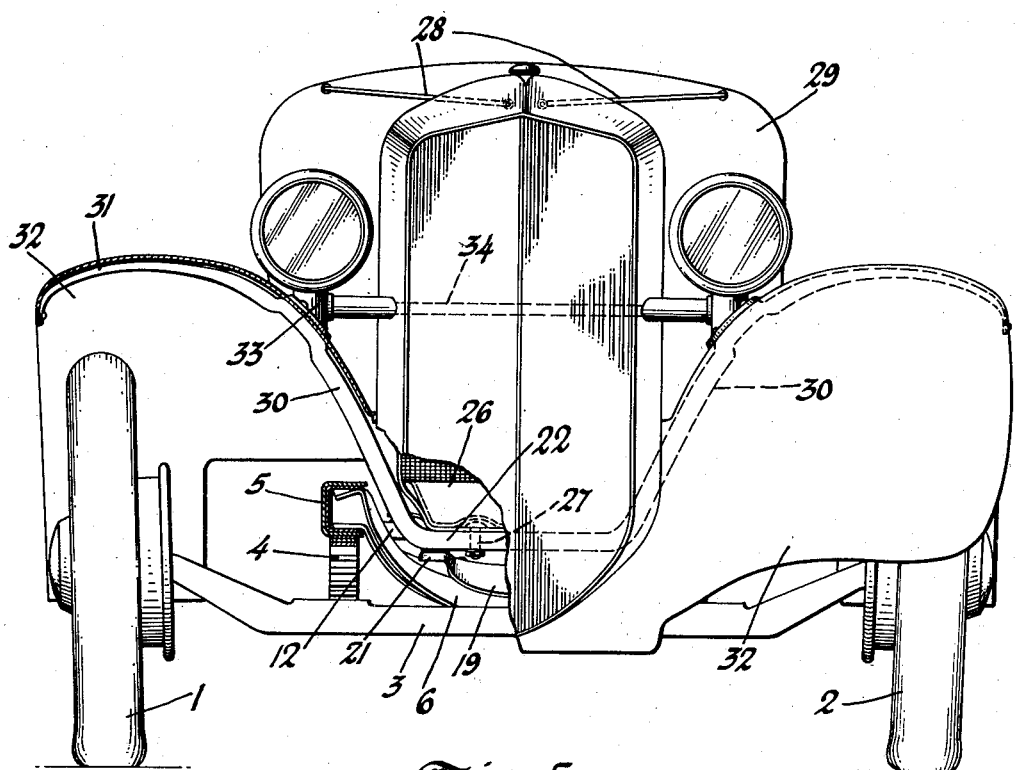
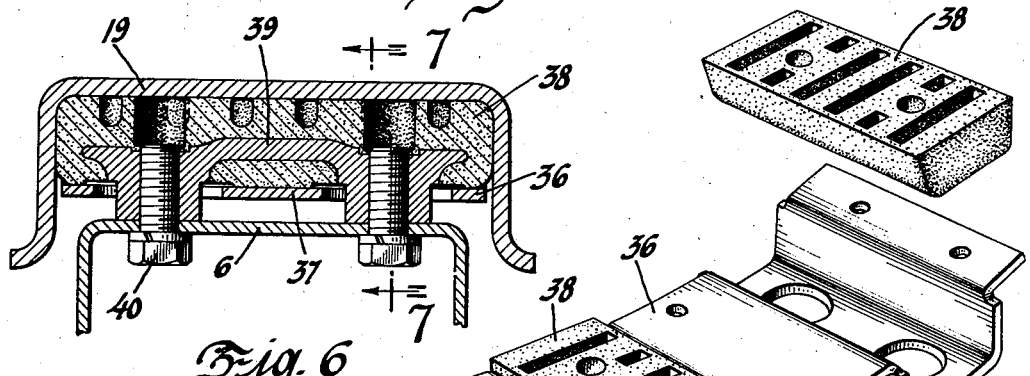
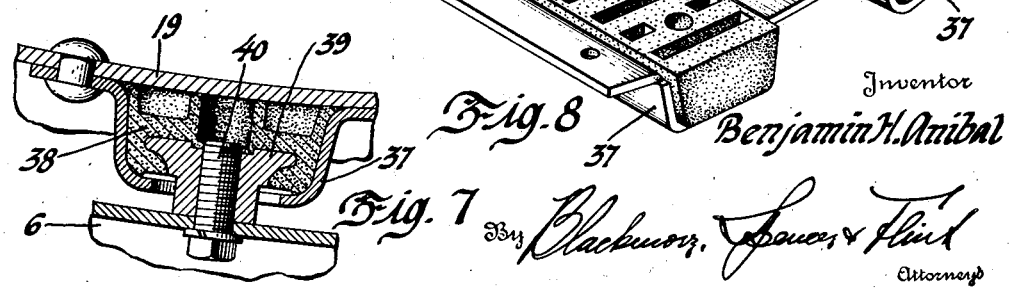
Inventor
Benjamin H. Anibal
By Blackmore, Sauers & Flint
Attorneys Patented Nov. 26, 1935

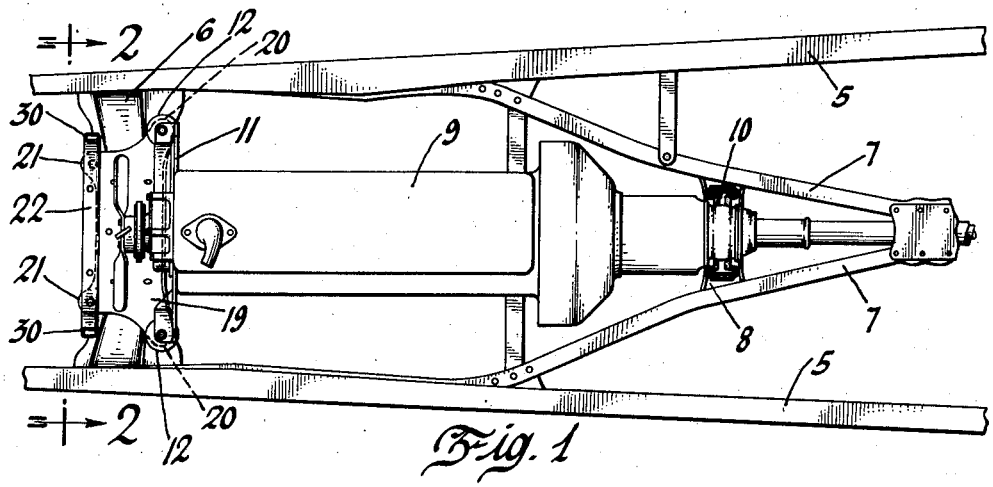
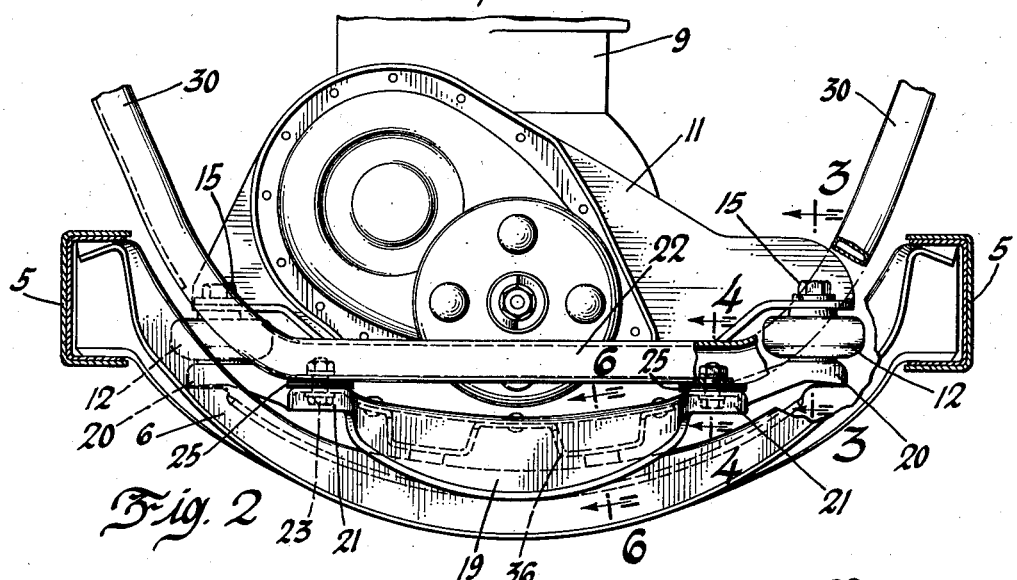
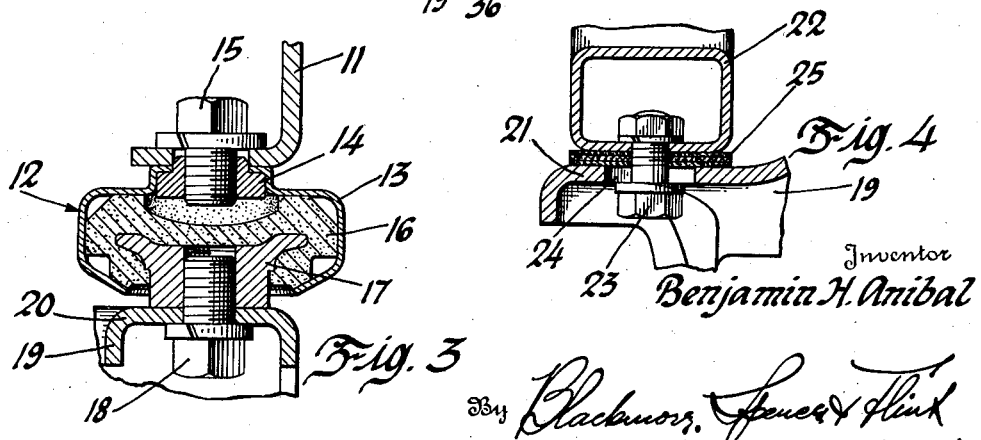

2,022,102

UNITED STATES PATENT OFFICE 2,022,102

ENGINE FRONT MOUNTING

Benjamin H. Anibal, Pontiac, Mich., assignor to General Motors Corporation, Detroit, Mich., a corporation of Delaware Application October 29, 1934, Serial No. 750,471

6 Claims. (Cl. 180—64)

This invention relates to motor vehicles and more particularly to an improved front end construction.

It is among the objects of the invention to provide a structure whereby engine vibration is not imparted to the chassis frame and associated parts and frame weaving or twisting is not imposed on the engine, the engine cooling radiator, the wheel fenders, or other parts carried by the frame.

To this end it is proposed in a specific embodiment of the invention to mount the front of the engine, through a pair of transversely spaced resilient joints which accommodate vibratory movement, on a supporting member which also carries the engine cooling radiator and fender brackets and is itself mounted centrally on the chassis frame through a resilient connection, whereby the parts supported thereby are free from frame weaving.

This construction additionally reduces the effects of road reaction on the vehicle, the several parts at the front end of the vehicle being non-rigidly connected with the chassis frame, the natural period of vibration of the frame is increased, it being understood that a rigid assembly has a high moment of inertia and a period of vibration so low that road reactions produce violent lateral shaking under certain conditions of travel within the speed range of the ordinary automobile.

For a better understanding of the invention reference may be had to the accompanying drawings, wherein Figure 1 is a top plan view of the front portion of a vehicle chassis showing the mounting of the parts thereon; Figure 2 shows in elevation the front end assembly with the chassis frame in section, as taken on line 2—2 of Figure 1; Figures 3 and 4 are detail sectional views taken on lines 3—3 and 4—4, respectively, of Figure 2; Figure 5 is a front elevation partly broken away and in section of a motor vehicle; Figure 6 is a sectional view taken on line 6—6 of Figure 2; Figure 7 is a section taken on line 7—7 of Figure 6, and Figure 8 is a detail perspective view of one of the mounting units showing the parts prior to assembly.

Referring to the drawings the reference characters 1 and 2 indicate front wheel assemblies hinged for steering purposes on opposite ends of a dead axle 3, which supports through suitable springs, as at 4, the vehicle chassis frame. The chassis frame consists principally of a pair of longitudinally extending channels 5 connected at the front by a cross or transverse member 6 with intermediate diagonals 7. Connecting the diagonal framing members is a transverse bar 8 which supports the rear end of the engine or power plant 9 through a suitable cushion joint 10, preferably of rubber.

At the front of the engine is a plate 11 which provides arms projecting laterally on both sides of the cylinder block for connection with rubber or other cushion mounting units 12. Such units may each be of the construction illustrated in Figure 3, where there is shown a pressed metal cup 13 having a nut 14 for a mounting stud 15 and enclosing a body 16 of rubber or other similar elastic deformable material, and which has embedded therein a nut 17 by which the unit is detachably connected through an anchor bolt 18 with a supporting member 19.

In the present instance the supporting member 19 is a plate-like pressing superposed above the cross member 6 and provided with a down turned marginal reinforcing flange. At its two rear corners it affords tabs or ears 20 for connection with the engine mounting units 12 while its two forward corners provide supporting tabs 21 on which is mounted the fender supporting bracket.

This fender supporting bracket is of substantially U-shape and of box cross section and its base portion 22 extends transversely of the vehicle and is attached to the ears 21 as shown in Figure 4, by mounting studs 23. A longitudinally elongated slot 24 in each ear receives the anchorage bolts 23 and provides for relative adjustment, there being discs 25 of friction material, such as brake lining, interposed between the parts 21 and 22 to resist accidental displacement.

As best seen in Figure 5 the engine cooling radiator 26 conveniently rests upon the upper surface of the base 22 and is secured thereto by anchorage bolts as at 27. For bracing the upper end of the radiator divergently disposed tie bars 28 extend rearwardly to the body dash board 29.

The two legs 30 of the U-shape fender bracket extend upwardly and outwardly at 31 over the road wheels to support the forward ends of the wheel fenders or splash guards 32 and any other sheet metal usually associated with the fenders. These arms additionally carry lamp brackets 33 which may be connected to each other by a tie bar 34 or with the radiator structure as desired, thereby to provide a firm bracing for the combined fender and radiator supporting cross bar.

The supporting plate 19 with the several parts connected thereto, is mounted upon the chassis f frame at the longitudinal center line of the vehicle for movement relative to the frame, by means of a resilient connection which may be constructed as shown in the detail views, Figures 6, 7 and 8. The unit there shown involves a sheet metal stamping 36 adapted to be riveted on the underside of the plate 19 and provided with a pair of channels 37 to receive preformed molded blocks 38 of rubber or the like, having embedded therein a forging 39 formed with a pair of projecting bosses to extend through openings in the channels 37 and receive mounting studs 40 by which the plate is detachably connected to the frame member 6.

Inasmuch as the supporting plate 19 is movably joined to the chassis frame and is movably connected with the front of the engine it will be apparent that any twisting of the chassis frame, such as occurs because of irregularities in road surface, and which is most pronounced in the forward portions of the longitudinal frame members, since they tend to bend in the vertical plane at about the location of the vehicle body dash board, may occur without appreciably affecting or producing the appearance of instability of the front end assembly, particularly the fenders and radiator, and that likewise vibratory motion of the engine may occur without carrying along the supporting plate and parts mounted thereon and without causing the chassis frame to move in unison therewith.

I claim:

1. The combination with an engine and a fender support, of a chassis frame member and means mounting the engine and fender support for movement relative to each other and to the frame member, and including a mounting element, means movably connecting said element to the frame member, means rigidly connecting said element to the fender support and means movably connecting said element to the engine.

2. In combination, a chassis frame cross member, a plate-like element superposed thereabove, a centrally disposed resilient joint beneath the element connecting the same to the cross member, means to resiliently connect an engine to said element and other means for rigidly joining as a unit with said element an engine cooling radiator and a fender support.

3. The combination with a chassis frame, an engine and a fender support, of means connecting the frame, engine and support for movement relative to each other, including a mounting element, means mounting the support on the element, means movably mounting the engine on the element and means movably mounting the element on the frame.

4. In a motor vehicle, a chassis frame, a substantially U-shape bracket member having its legs projecting upwardly and outwardly of the frame to support wheel fenders, means to connect an engine cooling radiator rigid with the base of said member, a supporting plate-like element interposed between said member and the frame, a centrally disposed rubber joint connecting said plate-like element to the frame and a pair of transversely spaced rubber joints carried by the plate-like element for mounting an engine thereon.

5. In a motor vehicle, a chassis frame supported upon road wheels, a combined fender and radiator support flexibly mounted on the frame centrally thereof, a power plant and a pair of transversely spaced resilient connections between the front of the power plant and said support.

6. The combination with a chassis frame and a power plant, of means resiliently mounting the power plant in the frame and including a resilient connection between one end of the power plant and the frame, an auxiliary mounting member between the opposite end of the power plant and the frame, means resiliently connecting said member and the frame centrally thereof and a pair of resilient connections on opposite sides of said connecting means supporting the engine on said member.

BENJAMIN H. ANIBAL.